(12) United States Patent
Yi et al.

(10) Patent No.: US 10,880,515 B2
(45) Date of Patent: Dec. 29, 2020

(54) AUDIO-VIDEO REPRODUCTION FOR CLOSED CAPTION DISPLAY CONTROL BASED ON MULTI-MEDIA CONTENT

(71) Applicant: SONY CORPORATION, Tokyo (JP)

(72) Inventors: Hyehoon Yi, San Diego, CA (US); Toshihiko Fushimi, San Diego, CA (US); Lindsay Miller, San Diego, CA (US); David Young, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 84 days.

(21) Appl. No.: 16/220,750

(22) Filed: Dec. 14, 2018

(65) Prior Publication Data

US 2020/0195882 A1    Jun. 18, 2020

(51) Int. Cl.
*G06K 9/00* (2006.01)
*H04N 7/025* (2006.01)
*G06F 3/14* (2006.01)
*H04N 21/422* (2011.01)

(52) U.S. Cl.
CPC ......... *H04N 7/0255* (2013.01); *G06F 3/1423* (2013.01); *G06K 9/00362* (2013.01); *G06K 9/00624* (2013.01); *H04N 21/42204* (2013.01)

(58) Field of Classification Search
CPC .......... G06F 3/14; G06F 3/1423; G06F 3/167; G09G 2340/125; G10L 15/22; G10L 2015/223; H04M 1/271; H04M 3/493; H04N 2005/4442; H04N 21/20; H04N 21/2393; H04N 21/40; H04N 21/4104; H04N 21/4122; H04N 21/4147; H04N 21/42203; H04N 21/431; H04N 21/435; H04N 21/47; H04N 21/4722; H04N 5/4403; H04N 5/44513; H04N 5/44582; H04N 7/0255; G06K 9/00362; G06K 9/00624
See application file for complete search history.

(56) References Cited

U.S. PATENT DOCUMENTS 5,537,151 A     7/1996  Orr et al.
8,850,496 B2 *  9/2014  Baskaran ......... H04N 21/25808
                                              725/136

(Continued)

OTHER PUBLICATIONS

Zustak, et al., "Dynamically Placing Closed Captioning Outside Rendered Video", Technical Disclosure Commons, May 8, 2017, 3 pages.

*Primary Examiner* — Ian L Lemieux
(74) *Attorney, Agent, or Firm* — Chip Law Group

(57) ABSTRACT

An audio and video reproduction apparatus that comprises a memory, a display screen, and circuitry. The memory stores a sequence of image frames of multi-media content and closed caption (CC) information associated with the multi-media content. The circuitry detects a first position of a first object in an image frame, of the sequence of image frames, to be displayed on the display screen. The circuitry further controls, based on a user-input, the display screen to display the image frame in a first display portion of the display screen and display a first portion of the CC information at a second position in a second display portion of the display screen. The first portion of the CC information is displayed at the second position in the second display portion, based on the detected first position of the first object in the image frame.

17 Claims, 11 Drawing Sheets

(56) References Cited

U.S. PATENT DOCUMENTS

| | | | | |
|---|---|---|---|---|
| 2007/0252913 A1* | 11/2007 | Minobe | .............. | H04N 21/4884 |
| | | | | 348/465 |
| 2009/0027552 A1* | 1/2009 | Yang | .................. | H04N 21/4884 |
| | | | | 348/465 |
| 2012/0293712 A1* | 11/2012 | Mountain | .......... | H04N 21/4884 |
| | | | | 348/468 |
| 2013/0014155 A1* | 1/2013 | Clarke | .................. | G06F 16/433 |
| | | | | 725/32 |
| 2014/0176813 A1* | 6/2014 | Conness | .......... | H04N 21/44218 |
| | | | | 348/738 |
| 2015/0277552 A1* | 10/2015 | Wilairat | ............. | H04N 21/4884 |
| | | | | 386/244 |
| 2017/0332035 A1 | 11/2017 | Shah et al. | | |
| 2018/0114509 A1* | 4/2018 | Mese | ..................... | G06F 3/011 |

* cited by examiner

AUDIO-VIDEO REPRODUCTION FOR CLOSED CAPTION DISPLAY CONTROL BASED ON MULTI-MEDIA CONTENT

CROSS-REFERENCE TO RELATED APPLICATIONS/INCORPORATION BY REFERENCE

None.

FIELD

Various embodiments of the disclosure relate to audio-video (AV) content reproduction technologies. More specifically, various embodiments of the disclosure relate to an audio-video reproduction for closed caption display based on multimedia content.

BACKGROUND

Recent advancements in the field of content reproduction have led to development of various techniques to reproduce multi-media content and metadata associated with the multi-media content. The metadata reproduced with the multi-media content may be closed captions. Examples of the closed captions may include, but are not limited to, subtitles, transcription, commentary, reports, updates, or emotion tags. Certain conventional systems display the closed captions in a manner that the closed captions obscure the reproduced multi-media content and is not visually pleasing to a viewer of the multi-media content. Thus, an advanced system may be desired to dynamically control the display of the closed captions to provide a better viewing experience of the multi-media content and the closed captions to the viewer.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An audio-video reproduction apparatus and a method for closed caption display control based on rendered content is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
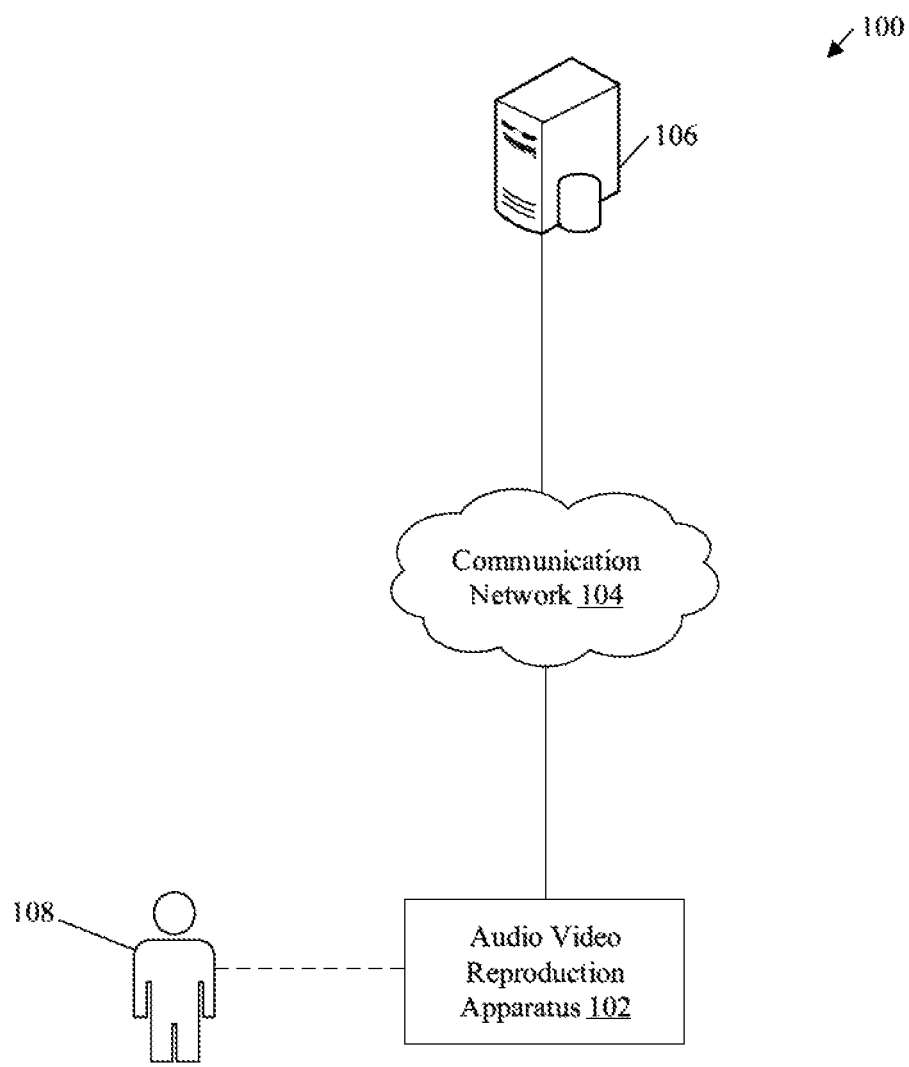
FIG. 1 is a block diagram that illustrates an exemplary network environment for control of display of closed captions based on multi-media content, in accordance with an embodiment of the disclosure.

The following described implementations may be found in a disclosed apparatus and a method for closed caption display control based on multi-media content. Exemplary aspects of the disclosure may include an audio video (AV) reproduction apparatus which provides an enhanced viewing experience to a viewer by dynamic control of display positions and characteristics of closed captions on a display screen based on rendered multi-media content and user-inputs.

The disclosed AV reproduction apparatus may include a memory which may be configured to store a sequence of image frames of the multi-media content and closed caption (CC) information associated to the multi-media content. The multi-media content (for example a movie or a video clip) may include one or more objects which may be associated with the audio content. Examples of the audio content may include, but are not limited to, a dialogue, a sound effect, musical cues, audible tone, or other audio information. The CC information may include textual representation, transcription or translation of the audio content. The AV reproduction apparatus may detect positions of one or more objects in the sequence of image frames to be displayed on a display screen. The positions of the one or more objects may indicate the display positions of the one or more objects on the display screen. The AV reproduction apparatus may further control display of the sequence of image frames at a first display position of the display screen. The AV reproduction apparatus may further control the display of the CC information, associated with the audio content of the one or more objects, at a second display position of the display screen based on the detected positions of the one or more objects, where the first display position is different from the second display position of the display screen. Thus, with different display positions, the displayed CC information does not obscure the displayed sequence of image frames of the multi-media content.

In accordance with an embodiment, the second display position of the CC information may be based on different parameters associated with the AV reproduction apparatus. The different parameters may include, but are not limited to a shape, a size, a resolution, and an aspect ratio of the AV reproduction apparatus. In accordance with an embodiment, the AV reproduction apparatus may further change display characteristics of the displayed CC information based on at least one of a user input or user information of a user of the AV reproduction apparatus. The display characteristics may include, but are not limited to, a font style, size, a display direction, a foreground color, a background color, an orientation, a contrast value, or a language of the displayed CC information. The user information may include, a distance of a viewer from the AV reproduction apparatus or a posture of the viewer. The AV reproduction apparatus may further control display of the sequence of image frames of the multi-media content based on the display characteristics of the CC information. Thus, the disclosed AV reproduction apparatus dynamically displays the multi-media content and the CC information at different positions and with different display characteristics which further provides an enhanced viewing experience to the viewer.

FIG. 1 is a block diagram that illustrates an exemplary network environment for control of display of closed captions based on multi-media content, in accordance with an embodiment of the disclosure. With reference to FIG. 1, there is shown a network environment 100 that includes an audio-video (AV) reproduction apparatus 102, a communication network 104, and a multi-media content source 106. There is further shown a user (for example a user 108) associated with the AV reproduction apparatus 102. The user 108 may interact with the AV reproduction apparatus 102 or may be a viewer of the AV reproduction apparatus 102. The AV reproduction apparatus 102 may be communicatively coupled to the multi-media content source 106, via the communication network 104.

The AV reproduction apparatus 102 may comprise suitable logic, circuitry, interfaces, and/or code that may be configured to display multi-media content and CC information associated with the multi-media content on a display screen (not shown in FIG. 1). The AV reproduction apparatus 102 may be configured to receive the multi-media content and the CC information from the multi-media content source 106, through the communication network 104. The AV reproduction apparatus 102 may be configured to detect positions of a plurality of objects in a sequence of image frames of the multi-media content. The AV reproduction apparatus 102 may be further configured to control display of the sequence of image frames in a first display portion of the display screen and the CC information associated with the plurality of objects in a second display portion of the display screen based on the detected positions. Examples of the AV reproduction apparatus 102 may include a television (TV) system, a computing device, audio-video (AV) entertainment system, a display system, a laptop computer, a wearable device, a media receiver, such as a set top box (STB), a digital media player, a micro-console, a game console, a smartphone, a tablet computer, a special-purpose device, a video-conferencing system, a compact disc (CD) player, a mainframe machine, a computer work-station, a consumer electronic (CE) device, or a media processing system.

The communication network 104 may include one or more communication mediums through which the AV reproduction apparatus 102 may communicate with the multi-media content source 106. Examples of the communication network 104 may include, but are not limited to, a Wireless Fidelity (Wi-Fi) network, a Local Area Network (LAN), a Personal Area Network (PAN), a wireless personal area network (WPAN), a Wireless Local Area Network (WLAN), a wireless wide area network (WWAN), a cloud network, a Long Term Evolution (LTE) network, a Metropolitan Area Network (MAN), and/or the Internet. Various devices in the exemplary network environment 100 may be configured to connect to the communication network 104, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols, including variants thereof.

The multi-media content source 106 may comprise suitable logic, circuitry interfaces, and/or code that may be configured to store the multi-media content and transmit the multi-media content to the AV reproduction apparatus 102, in response to requests received from the AV reproduction apparatus 102. In accordance with an embodiment, the multi-media content source 106 may be configured to store the CC information associated with the multi-media content. In accordance with an embodiment, the multi-media content source 106 may be configured to transmit the multi-media content and the associated CC information in a single encoded file. Examples of the multi-media content may include, but are not limited to, audio-video (AV) content, video content, animation content, gaming content, and/or interactive content. In some embodiments, the multi-media content and the CC information may be stored and transmitted as separate files. The multi-media content source 106 may be further configured to provide the multi-media content to the AV reproduction apparatus 102 via the communication network 104. In some embodiments, the multi-media content source 106 is a server which may be configured to store the multi-media content. In some embodiments, the server may be implemented as a cloud server, which may be utilized to execute aforementioned operations of the multi-media content source 106 through web applications, cloud applications, HTTP requests, repository operations, file transfer, gaming operations, and the like. Other examples of the server include, but are not limited to a database server, a file server, a web server, an application server, a mainframe server, a cloud server, or other types of server.

In accordance with an embodiment, the multi-media content source 106 may be a personal media device that may deliver the multi-media content to the AV reproduction apparatus 102, via the communication network 104. Examples of the personal media device may include, but are not limited to, a set-top-box (STB), a digital versatile disc (DVD) player, a videocassette recorder (VCR) player, a smartphone, a video player, a laptop, a personal computer, a personal external storage, and a flash drive.

In operation, the AV reproduction apparatus 102 may be configured to receive a user input from the user 108. The user input may correspond to a request to display the multi-media content on the display screen associated with the AV reproduction apparatus 102. The user input may include selection of the multi-media content to be displayed. For example, the user input for the multi-media content may include, but are not limited to, a channel number, a program name, an artist name, a content identifier, a content genre, a content source, and likes. In accordance with an embodiment, the AV reproduction apparatus 102 may be configured to retrieve the multi-media content and the CC information from an internal memory (not shown in FIG. 1) based on the received user input. In some embodiments, the AV reproduction apparatus 102 may be configured to transmit a beacon or a request signal to the multi-media content source 106 based on the received user input. The request signal may comprise a request to provide the multi-media content and corresponding CC information to the AV reproduction apparatus 102, via the communication network 104.

In accordance with an embodiment, the received multi-media content may include a sequence of image frames. The sequence of image frames may include one or more objects captured by an image capturing device (not shown). The one or more objects in each of the sequence of image frame may be associated with audio content. Examples of the audio content associated with the one or more objects may include, but are not limited to, a dialogue, a sound effect, musical cues, audible tone, or other audio information. In accordance with an embodiment, the received multi-media content may include the CC information. The CC information may include a plurality of portions, where each portion may correspond to the audio content associated with one or more objects in each of the sequence of image frame. The CC information may include textual representation, transcription or translation of the audio content of the one or more objects.

In accordance with an embodiment, the AV reproduction apparatus 102 may be configured to detect positions of the one or more objects in the sequence of image frames of the multi-media content to be rendered on the display screen for the user 108. In accordance with an embodiment, the AV reproduction apparatus 102 may be configured to detect the positions of the one or more objects which are associated with the corresponding audio content. The detected positions may indicate display positions of the one or more objects on the display screen.

In accordance with an embodiment, the AV reproduction apparatus 102 may be further configured to control display of the sequence of image frames in a first display portion on the display screen. The AV reproduction apparatus 102 may be further configured to control display of the plurality of portions of the CC information at a second position in a second display portion of the display screen. The second position of the display of the plurality of portions of the CC information of different image frames may be based on the detected positions of the one or more objects in the corresponding image frames. The second display portion may be different from the first display portion. In some embodiments, the display position or size of the second display portion may be based on the first display portion. Thus, the AV reproduction apparatus 102 provides the display of CC information on the display position which may be different from the display position of the image frame. Further, the capability of the AV reproduction apparatus 102 to display different portions of the CC information based on the detected positions of the objects in the image frames, further provides an enhanced viewing experience of the multi-media content and the CC information to the user 108. In accordance with an embodiment, the AV reproduction apparatus 102 may be configured to control the display of the CC information at a display position which is closed to the display position of the corresponding object. This may further provide the user 108 (for example a hearing-impaired user) with the capability to not only to comprehend the multi-media content, but also to realize the association between the CC information and the corresponding objects in the displayed image frames.

Figure 2:
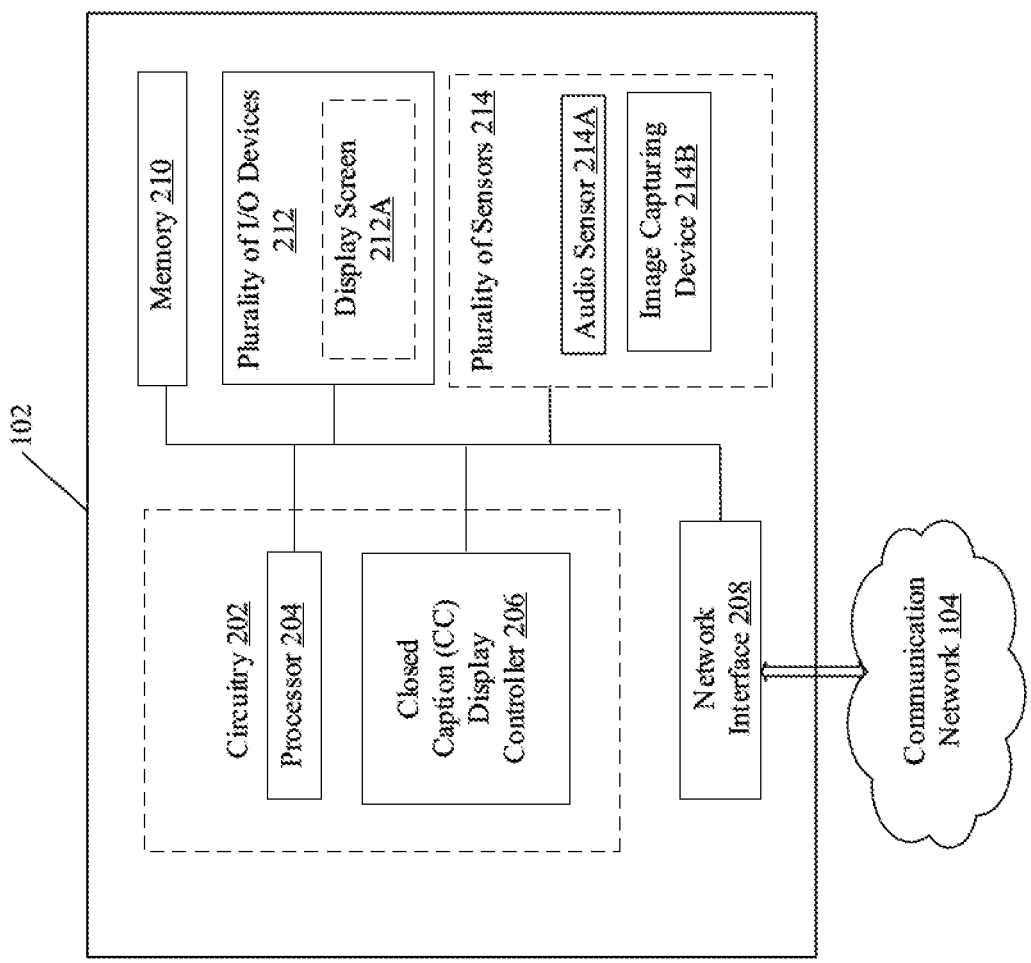
FIG. 2 is a block diagram that illustrates an audio video (AV) reproduction apparatus for control of display of closed captions based on multi-media content, in accordance with an embodiment of the disclosure.

FIG. 2 is a block diagram that illustrates an audio video (AV) reproduction apparatus for control of display of closed captions based on multi-media content, in accordance with an embodiment of the disclosure. FIG. 2 is explained in conjunction with elements from FIG. 1. With reference to FIG. 2, there is shown the AV reproduction apparatus 102. The AV reproduction apparatus 102 may include circuitry 202 which may further include a processor 204 and a closed caption (CC) display controller 206. The AV reproduction apparatus 102 may further include a network interface 208, a memory 210, a plurality of input/output (I/O) devices 212, and a plurality of sensors 214. The plurality of I/O devices 212 may include a display screen 212A. The plurality of sensors 214 may include an audio sensor 214A and an image capturing device 214B. The circuitry 202 may be communicatively coupled with the network interface 208, the memory 210, the plurality of I/O devices 212, and the plurality of sensors 214, via a set of communication ports/channels or a channel bus.

The processor 204 may comprise suitable logic, circuitry, interfaces, and/or code that may be configured to execute a set of instructions stored in the memory 210. The processor 204 may be configured to retrieve the multi-media content and the CC information from the memory 210. The processor 204 may be further configured to request and receive the multi-media content and the CC information from the multi-media content source 106, via the communication network 104. The processor 204 may be configured to control the plurality of I/O devices 212 and the plurality of sensors 214 to receive the user input from the user 108. The processor 204 may be further configured to detect positions of one or more objects in the sequence of image frames of the multi-media content. The processor 204 may be further configured to control display of the multi-media content and the CC information on the display screen 212A based on the received user input and/or the detected positions of the one or more objects. Examples of the processor 204 may include, but are not limited to, an x86-based processor, an x64-based processor, a Reduced Instruction Set Computing (RISC) processor, an Application-Specific Integrated Circuit (ASIC) processor, a Complex Instruction Set Computing (CISC) processor, a microcontroller, a microprocessor, a central processing unit (CPU), or other control circuits.

The CC display controller 206 may comprise suitable logic, circuitry, interfaces, and/or code that may be configured to control the display position and the display characteristics of the CC information. Examples of the display characteristics may include, but are not limited to, a font, size, a display direction, a foreground color, a background color, an orientation, a contrast value, or a language of the displayed CC information. The CC display controller 206 may be configured to control the display position and the display characteristics of the CC information based on one of the detected positions of the one or more objects, the user input, or user information (for example distance between the user 108 and the AV reproduction apparatus 102 and the posture of the user 108). The functionality of the CC display controller 206 may be described in detail, for example, in FIGS. 3, 5A, 5B, 5C, 6, and 7. The CC display controller 206 may be implemented based on the processor, such as one of a programmable logic controller (PLC), a microcontroller, a microprocessor, an X86-based processor, an x64-based processor, a Reduced Instruction Set Computing (RISC) processor, an Application-Specific Integrated Circuit (ASIC) processor, a Complex Instruction Set Computing (CISC) processor, and/or other hardware processors.

The network interface 208 may comprise suitable logic, circuitry, interfaces, and/or code that may be configured to establish a communication between the AV reproduction apparatus 102 and the multi-media content source 106, via the communication network 104. In accordance with an embodiment, the network interface 208 may be configured to transmit a content request to the multi-media content source 106, based on a control signal received from the processor 204. The network interface 208 may be further configured to receive and distribute the multi-media content to different components of the AV reproduction apparatus 102. The network interface 208 may implement known technologies to support wireless communication. The network interface 208 may include, but are not limited to an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The memory 210 may comprise suitable logic, circuitry, interfaces, and/or code that may be configured to store a set of instructions executable by the processor 204 and the CC display controller 206. The memory 210 may be further configured to store the multi-media content and the CC information received from the multi-media content source 106. The memory 210 may be configured to further store information (for example a shape, a size, or an aspect ratio) related to the display screen 212A. The memory 210 may be further configured to store different display characteristics (for example a plurality of font styles, a plurality of foreground colors, a plurality of background colors, or a plurality of characters of different languages) related for the CC information. Examples of implementation of the memory 210 may include, but are not limited to, Random Access Memory (RAM), Read Only Memory (ROM), Hard Disk Drive (HDD), and/or a flash drive.

The plurality of I/O devices 212 may comprise suitable logic, circuitry, interfaces, and/or code that may be configured to provide an I/O channel/interface between the user 108 and the different operational components of the AV reproduction apparatus 102. The plurality of I/O devices 212 may receive the user-input from the user 108 and present an output provided by the processor 204 to the user 108. Examples of the user input may include, but is not limited to a touch input, a voice input, or a gesture input. The plurality of I/O devices 212 may include various input and output ports to connect various other I/O devices that may communicate with different operational components of the AV reproduction apparatus 102. Examples of an input device of the plurality of I/O devices 212 may include, but are not limited to, a touch screen, a keyboard/keypad, a set of buttons, a mouse, a joystick, and a microphone. Examples of an output device of the plurality of I/O devices 212 may include, but are not limited to, a display device (for example, the display screen 212A), a speaker, and a haptic or any sensory output device.

The display screen 212A may comprise suitable logic, circuitry, interfaces, and/or code that may be configured to render an application interface to display information to the user 108 operating the AV reproduction apparatus 102. The display screen 212A may be configured to display the multi-media content including visual information (i.e. image or video) and the CC information associated with the multi-media content. In accordance with an embodiment, the display screen 212A and the AV reproduction apparatus 102 may act as separate entities. In such case, the AV reproduction apparatus 102 may control the display screen 212A to display the multi-media content and the associated CC information. The display screen 212A may be realized through several known technologies including, but not limited to, at least one of a Liquid Crystal Display (LCD) display, a Light Emitting Diode (LED) display, a plasma display, and an Organic LED (OLED) display technology, and other display. In accordance with an embodiment, the display screen 212A may refer to a display screen of smart-glass device, a see-through display, a projection-based display, an electro-chromic display, and a transparent display.

The plurality of sensors 214 may comprise suitable logic, circuitry, interface, and/or code that may be configured to detect different parameters related to the user 108. Examples of the different parameters may include, but are not limited to, voice commands received from the user 108, position of the user 108 with respect to the AV reproduction apparatus 102, posture of the user 108, or facial expressions of the user 108. The plurality of sensors 214 may include, but is not limited to, the audio sensor 214A and the image capturing device 214B.

The audio sensor 214A may comprise suitable logic, circuitry, interfaces, and/or code that may be configured to capture one or more voice commands from the user 108. The captured one or more voice commands may be a part of the user input received from the user 108. The audio sensor 214A may be positioned on a body of the user 108 or may be positioned at a particular location on or around the AV reproduction apparatus 102. Examples of the audio sensor 214A may include, but are not limited to, a microphone or other audio capturing device known in the art.

The image capturing device 214B may comprise suitable logic, circuitry, interfaces, and/or code that may be configured to capture a plurality of images of the user 108. The captured plurality of images may be utilized to determine the position of the user 108 based on which a distance between the user 108 and the AV reproduction device may be determined. In some embodiments, the captured plurality of images may be utilized to determine a height and orientation of the user 108 based on which the posture of the user 108 with respect to the AV reproduction apparatus 102 may be determined. The captured plurality of images may be further utilized to determine a facial expression of the user 108 based on an effect of the displayed multi-media content and the CC information on the user 108. The facial expression may indicate one or more motions or positions of muscles of a face of the user 108, where the facial expressions may manifest an emotion. The image capturing device 214B may be positioned at a particular location in a three-dimensional (3D) space to capture the plurality of image frames of the user 108. In accordance with an embodiment, the image capturing device 214B and the AV reproduction apparatus 102 are separate entities. Examples of the image capturing device 214B may include, but are not limited to, an image sensor, a wide-angle camera, depth sensor, an action camera, a closed-circuit television (CCTV) camera, a camcorder, a time-of-flight camera (TOF camera), IR sensor, a night-vision camera, a position sensor, a posture sensor, and/or other image capturing devices.

The functions or operations executed by the AV reproduction apparatus 102, as described in FIG. 1, may be performed by the circuitry 202 (such as the processor 204 and the CC display controller 206) are further described, for example, in the FIGS. 3, 4, 5A, 5B, 5C, 6, and 7.

Figure 3:
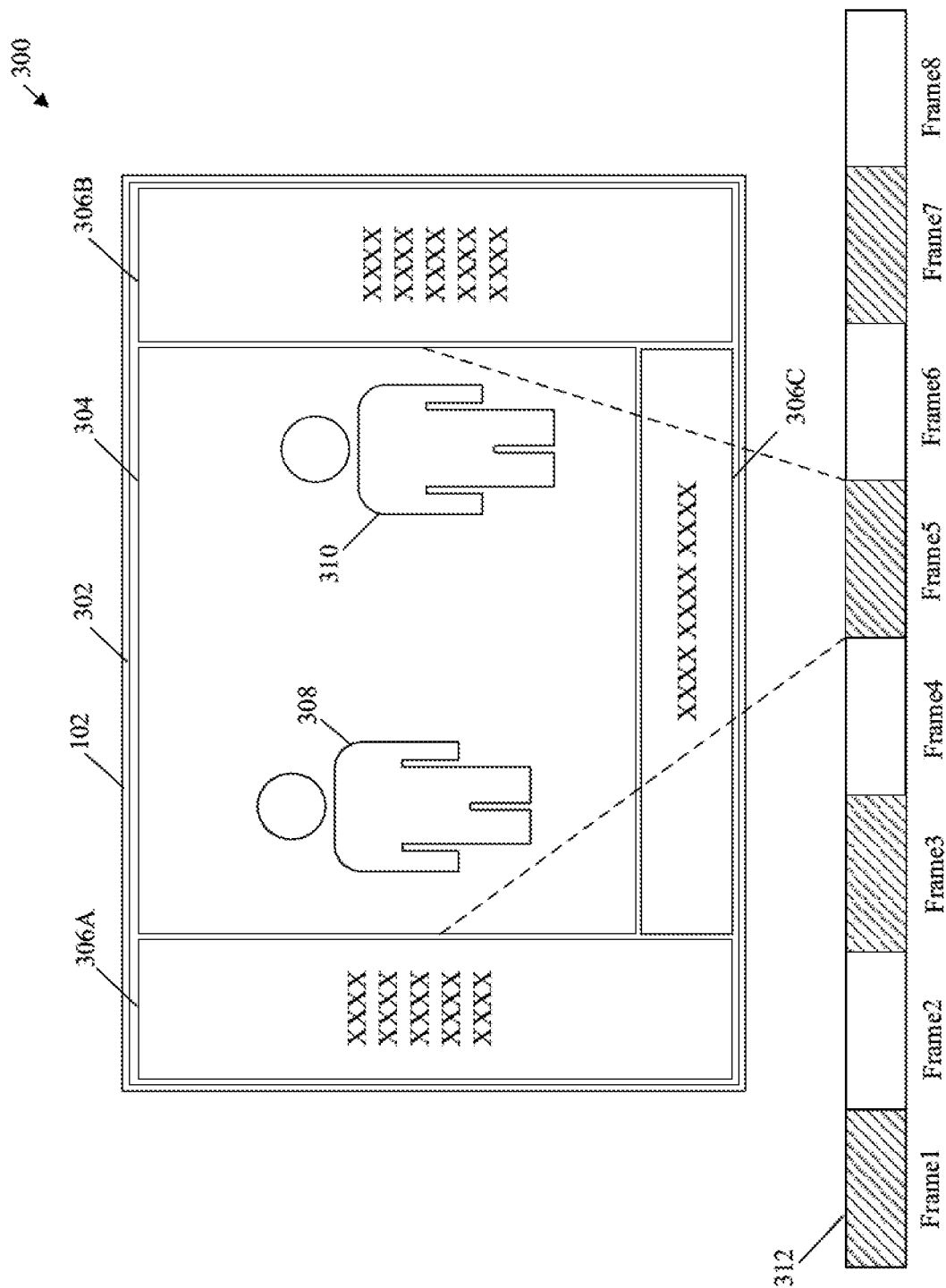
FIG. 3 illustrates a first exemplary scenario for control of display of closed captions based on multi-media content by the AV reproduction apparatus of FIG. 2, in accordance with an embodiment of the disclosure.

FIG. 3 illustrates a first exemplary scenario for control of display of closed captions based on multi-media content by the AV reproduction apparatus of FIG. 2, in accordance with an embodiment of the disclosure. FIG. 3 is explained in conjunction with elements from FIGS. 1 and 2. With reference to FIG. 3, there is shown a scenario 300 of the AV reproduction apparatus 102.

In scenario 300, there is shown the AV reproduction apparatus 102. The AV reproduction apparatus 102 may include a display area 302 (for example display screen 212A) to display of the multi-media content and the CC information associated with the multi-media content. In accordance with an embodiment, the display area 302 may include a first display portion 304, a second display portion 306A, a third display portion 306B, and a fourth display portion 306C. The CC display controller 206 may be configured to control display of a sequence of image frames (for example a sequence of image frames 312) of the multi-media content at the first display portion 304. The CC display controller 206 may be further configured to control display of the CC information on at least one of the second display portion 306A, the third display portion 306B, or the fourth display portion 306C.

In accordance with an embodiment, in response to a user input, the processor 204 may be configured to extract an image frame (for example Frame 5 in FIG. 3) from the sequence of image frames 312 of the multi-media content. The user input may be a request from the user 108 to render the multi-media content and the associated CC information. In some embodiments, the user input may be to only render the multi-media content without the associated CC information. In such case, the processor 204 may be configured to disable or turn-off a closed caption feature of the AV reproduction apparatus 102. The sequence of image frames 312 may be captured by a video capturing device (not shown) to create the multi-media content. The multi-media content may include the sequence of image frames 312 and associated audio content related to one or more objects included in each image frame of the sequence of image frames 312.

In accordance with an embodiment, the processor 204 may be further configured to detect a first object 308 and a second object 310 in the extracted image frame (for example Frame 5) that is to be displayed on the display screen 212A. The first object 308 and the second object 310 may be an image of a person or a non-living entity with which the audio content may be associated. In accordance with an embodiment, the object 308 and the second object 310 may be images of different people. In accordance with an embodiment, the audio content associated with each of the first object 308 and the second object 310 may be an audio or sound produced by the people (for example an actor) associated with the first object 308 and the second object 310 during the capture of the image frame by the video capturing device. In accordance with an embodiment, the first object 308 and the second object 310 may be an audio object. Examples of the audio content associated with the first object 308 and the second object 310 may include, but are not limited to, a dialogue, a sound effect, musical cues, audible tone, or other audio information. In some embodiments, the audio content may not be the sound or audio produced by the people during the capture of the image frame. In contrast, the audio content may be associated with a thought corresponding to the people which are related to the first object 308 and/or the second object 310. The multi-media content may further include a plurality of portions of the CC information associated with corresponding audio content of the first object 308 and the second object 310. The plurality of portions of the CC information may include textual representation, transcription or translation of the corresponding audio content.

In accordance with an embodiment, the processor 204 may be further configured to detect a first position of the first object 308 in the image frame to be displayed on the display area 302. The first position may indicate a display position of the first object 308 on the display area 302. The first position may indicate pixel information of the display area 302 at which the first object 308 is to be displayed. In accordance with an embodiment, the pixel information may include a pixel number (X, Y) based on a resolution of the display area 302. In some embodiments, the detected first position may indicate a side of the display area 302. For example, with reference to FIG. 3A, the first object 308 in the image frame is to be displayed on a left side of the display area 302.

In accordance with an embodiment, the CC display controller 206 may be configured to extract a first portion of the CC information that corresponds to the audio content of the first object 308. In accordance with an embodiment, the CC display controller 206 may be configured to control display of the first portion of the CC information based on the detected first position of the first object 308. For example, with respect to FIG. 3, the first portion (i.e. textual representation of the audio content of the first object 308) of the CC information may be displayed at a second position in the second display portion 306A based on the detection that the first position of the first object 308 is on the left side of the first display portion 304. The CC display controller 206 may be configured to generate or display the second display portion 306A on the left side of the display area 302 based on the detection that the first position of the first object 308 is on the left side of the in the image frame or the first display portion 304. Thus, the first portion of the CC information is displayed near to the first object 308.

Similarly, the processor 204 may be further configured to detect a third position of the second object 310 in the image frame to be displayed on the display area 302. The third position may indicate the display position of the second object 310 on the display area 302. The third position may indicate the pixel information (for example pixel number) of the display area 302 at which the second object 310 is to be displayed. In some embodiments, the detected third position may indicate a side of the display area 302. For example, with reference to FIG. 3A, the second object 310 in the image frame is to be displayed on a right side of the display area 302.

In accordance with an embodiment, the CC display controller 206 may be configured to extract a second portion of the CC information that corresponds to the audio content of the second object 310. The CC display controller 206 may be further configured to control display of the second portion of the CC information based on the detected third position of the second object 310. For example, with respect to FIG. 3, the second portion (i.e. textual representation of the audio content of the second object 310) of the CC information may be displayed at a fourth position in the third display portion 306B based on the detection that the second position of the second object 310 is on the right side of the first display portion 304. The CC display controller 206 may be configured to generate or display the third display portion 306B on the right side of the display area 302 based on the detection that the third position of the second object 310 is on the right side of the in the image frame or the first display portion 304. Thus, the second portion of the CC information is displayed near or close to the second object 308. The display of the portions of the CC information near to the corresponding objects may facilitates the user 108 (for example a hearing-impaired user) to visualize the relation between the object and the corresponding portion of the CC information in the image frame. For example, the user 108 (i.e. viewer of the multi-media content) may be able to accurately visualize which part of the audio content is spoken or produced by which particular object in the image frame. This may increase user's viewing experience of the multi-media content with the CC information, where the displayed CC information does not obscure the multi-media content.

In accordance with an embodiment, the processor 204 may be further configured to display the image frame (for example Frame 5) on the first display portion 304. The CC display controller 206 may be configured to adjust size of the first display portion 304 based on the generated the second display portion 306A and the third display portion 306B. In some embodiments, the CC display controller 206 may be configured to adjust the size or display position of the first display portion 304 based on the size or display position of the second display portion 306A and the third display portion 306B. In accordance with an embodiment, the processor 204 may be further configured to adjust size of the image frame based on the adjusted size of the first display portion 304 and further display the adjusted image frame in the first display portion 304 (as shown in FIG. 3). The processor 204 may be further configured to playback the audio content through a speaker (not shown) during the display of the image frame in the first display portion 304 and the corresponding portion of the CC information in different display portion in the display area (for example, the second display portion 306A or the third display portion 306B).

In accordance with an embodiment, the CC display controller 206 may be configured to control the size or the display position of the first display portion 304 and the second display portion 306B based on various factors associated with the display area 302. Examples of the various factors may include, but are not limited to, a shape, a size, or an aspect ratio of the display area 302 or the display screen 212A.

It may be noted that the position, size and shape of the second display portion 306A and the third display portion 306B shown in FIG. 3 are merely an example of functionalities of the disclosed AV reproduction apparatus 102. In accordance with an embodiment, the CC display controller 206 may be configured to dynamically control different display characteristics (for example position, orientation, background color, color/contrast of text, shape, or size of the second display portion 306A and the third display portion 306B based on the detected first position of the first object 308 and the detected second position of the second object 310 in the image frame, respectively. In some embodiments, the CC display controller 206 may be configured to dynamically control the display characteristics of the second display portion 306A and the third display portion 306B based on a corresponding size (or character length) of the textual representation of the audio content of the first object 308 and the second object 310 respectively. In some embodiments, the CC display controller 206 may be configured to generate a plurality of display portions to display the CC information of the image frame. A number of the plurality of display portions may be based on a number of objects (associated with respective audio content) present in the image frame.

In accordance with an embodiment, the multi-media content may include a third portion of the CC information that may not correspond to the first object 308 and the second object 310 in the image frame. For example, the third portion may be a textual representation or translation of a background music, narration of events, and likes. With respect to FIG. 3, the third portion of the CC information is displayed on the fourth display portion 306C which is different from the first display portion 304, the second display portion 306A, and the third display portion 306B. In accordance with an embodiment, the CC display controller 206 may be configured to dynamically control the display characteristics (for example position, orientation, shape, or size) of the fourth display portion 306C and the first display portion 304 based on the second display portion 306A and the third display portion 306B.

In accordance with an embodiment, the processor 204 may be configured to detect and recognize the first object 308 (or a number of objects included in the image frame (for example Frame 5 in FIG. 3). The processor 204 may be configured to detect the first object 308 based on object detection and classification technique. The object detection and classification technique may be based on, but is not limited to, numerical computation techniques using data flow graphs, a deep neural network (DNN) architecture, such as a convolutional neural network (CNN), a CNN-recurrent neural network (CNN-RNN), R-CNN, Fast R-CNN, and Faster R-CNN. In some embodiments, the processor 204 may detect the first object 308 based on other object identification techniques, such as human shape-based object boundary identification, pre-specified shape-based or template based object identification. In accordance with an embodiment, the processor 204 may be further configured to recognize the first object 308 based on a plurality of sample images stored in the memory 210 or the multi-media content source 106. For example, the first object 308 may be an image of a celebrity (for example an actor, a singer, a politician liked by the user 108) or a person related to the user 108 (for example a close friend or a family member). The processor 204 may be configured to recognize the first object 308 as being liked or preferred by the user 108 based on user preference information stored in the memory 210. The CC display controller 206 may be further configured to change the display characteristics of the CC information associated with the recognized first object 308. For example, the CC display controller 206 may be configured to display the CC information associated with the recognized first object 308 at a particular position (for example fourth display portion 306C) of the display area 302. In another example, the CC display controller 206 may be configured to display the CC information associated with the recognized first object 308 with a particular foreground color (which may be a favorite color of the user 108). Information about the favorite color of the user 108 may be stored in the user preference information stored in the memory 210.

In accordance with an embodiment, the processor 204 and the CC display controller 206 may be configured to execute pre-processing of each image frame of the sequence of image frames 312 before the display of the image frame and the corresponding CC information. For example, during the display of current image frame, the processor 204 and the CC display controller 206 may be configured to determine the display position and/or the display characteristic of the CC information for corresponding objects included in the upcoming image frames to be displayed. With respect to FIG. 3, for example, during the display of image frame (say Frame 5), the processor 204 and the CC display controller 206 may determine the display position and/or the display characteristic of the CC information for the corresponding objects present in a next image frame (say Frame 6). In some embodiments, the processor 204 and the CC display controller 206 may process multiple upcoming image frames to determine the corresponding display position and/or the display characteristic of the CC information In accordance with an embodiment, the processor 204 may be configured to analyze each image frame of the sequence of image frames 312 before the initiation of the display of a first image frame (say Frame 1) of the multi-media content. The processor 204 and the CC display controller 206 may be configured to determine display characteristics of the first display portion 304, and the second display portion 306A (or the third display portion 306B or the fourth display portion 306C) for each image frame in the sequence of image frames 312 based on the analysis before the initiation of the display of the multi-media content. In some embodiments, the processor 204 and the CC display controller 206 may be further configured to determine the display characteristics of each of the plurality of portions of the CC information for each object in each image frame before the initiation of the display of the first image frame (say Frame 1) of the multi-media content. The processor 204 may be further configured to store the determined display characteristics of each of the plurality of portions of the CC information in the memory 210. During the display of each image frame, the processor 204 may control the display of each image frame and the corresponding CC information based on the stored display characteristics for the corresponding image frame. Thus, the pre-processing of the sequence of image frames 312 and the identification of the display positions of the CC information based on the detected positions of audio objects provides smooth and seamless rendering of the multi-media content and the corresponding CC information at different positions of the display area 302.

In accordance with an embodiment, during the display of each image frame, the processor 204 may be further configured to control the playback of the audio content associated with different objects in each image frame through one or more speakers (not shown). In accordance with an embodiment, the multi-media content may include synchronization information (for example timing information) for each image frame to synchronize the playback of the audio content and the display of the image frame and corresponding portion of the CC information.

Figure 4:
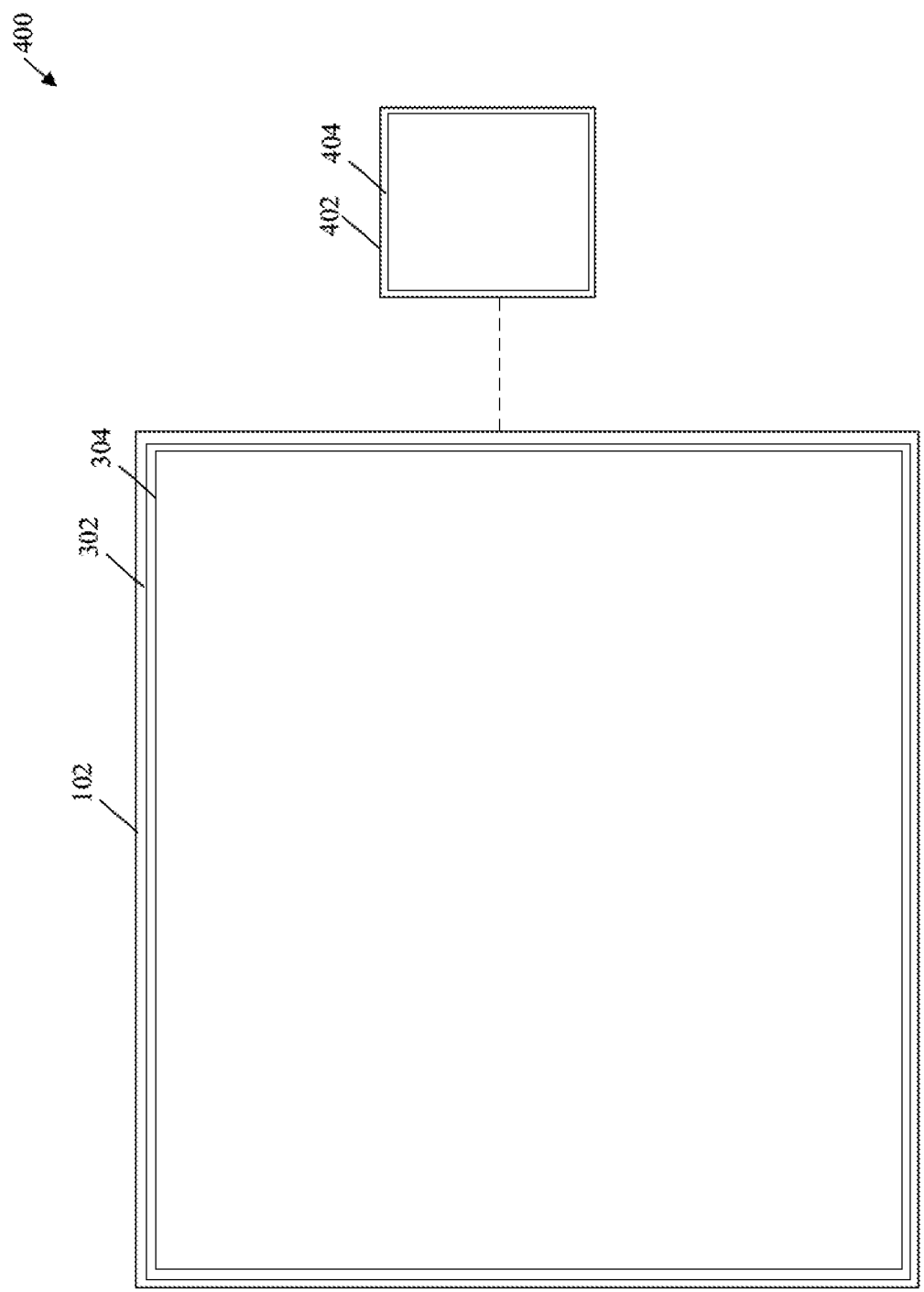
FIG. 4 illustrates an exemplary external display screen that displays closed captions received from the AV reproduction apparatus of FIG. 2, in accordance with an embodiment of the disclosure.

FIG. 4 illustrates an exemplary external display screen that displays closed captions received from the AV reproduction apparatus of FIG. 2, in accordance with an embodiment of the disclosure. FIG. 4 is explained in conjunction with elements from FIGS. 1, 2, and 3. With reference to FIG. 4, there is shown a scenario 400.

In the scenario 400, there is shown the AV reproduction apparatus 102 (as shown in FIG. 2) and an external display screen 402. The AV reproduction apparatus 102 may include the display area 302 (as shown in FIG. 3). The display area 302 may include the first display portion 304 to display the sequence of image frames 312 (shown in FIG. 3). The external display screen 402 may be communicatively coupled with the AV reproduction apparatus 102. The external display screen 402 may include a display area 404.

In accordance with an embodiment, the external display screen 402 may be a specialized display to display the CC information associated with the multi-media content. Examples of the external display screen 402 may include, but are not limited to, a display screen, a tablet, a projector screen, a laptop, a personal computer, a phone, or an electronic device with a display capability. In accordance with an embodiment, the processor 204 may be configured to receive the user input from the plurality of I/O devices 212 or the plurality of sensors 214 to communicatively couple with the external display screen 402. The processor 204 may be configured to establish a connection with the external display screen 402 based on the received user input. In accordance with an embodiment, the processor 204 may be configured to control display of the sequence of image frames 312 of the multi-media content on the first display portion 304 of the display area 302. The processor 204 may be further configured to transmit, via the network interface 208, the corresponding portions of the CC information for each image frame to the external display screen 402 for a synchronous display. In accordance with an embodiment, the processor 204 may be configured to control the external display screen 402 to display the transmitted portion of the CC information at the display area 404 of the external display screen 402. With external display screen 402, the user 108 may be able to view the appropriate CC information with each image frame separately.

In accordance with an embodiment, the processor 204 may be configured to control the external display screen 402 to display a specific portion of the CC information. Examples of the specific portion may include, but are not limited to, lyrics of songs in the multi-media content, dialogues of a particular actor in the multi-media content. In accordance with an embodiment, the memory 210 may store information with respect to the specific portion of the CC information. In some embodiments, the processor 204 may be configured to receive the information with respect to the specific portion in the user input from the user 108. For example, in the user input, the user 108 may indicate that he/she wants to see the CC information of a particular actor on the external display screen 402. In such case, the processor 204 may be configured to recognize an object of the particular actor in the sequence of image frames 312. The processor 204 may be further configured to transmit the corresponding portion of the CC information, associated with the audio content of the recognized object, to the external display screen 402. The processor 204 may be configured to transmit the corresponding portion of the CC information to the external display screen 402 while the display of the corresponding image frame (i.e. which includes the object of the particular actor) on the first display portion 304.

Figure 5A:
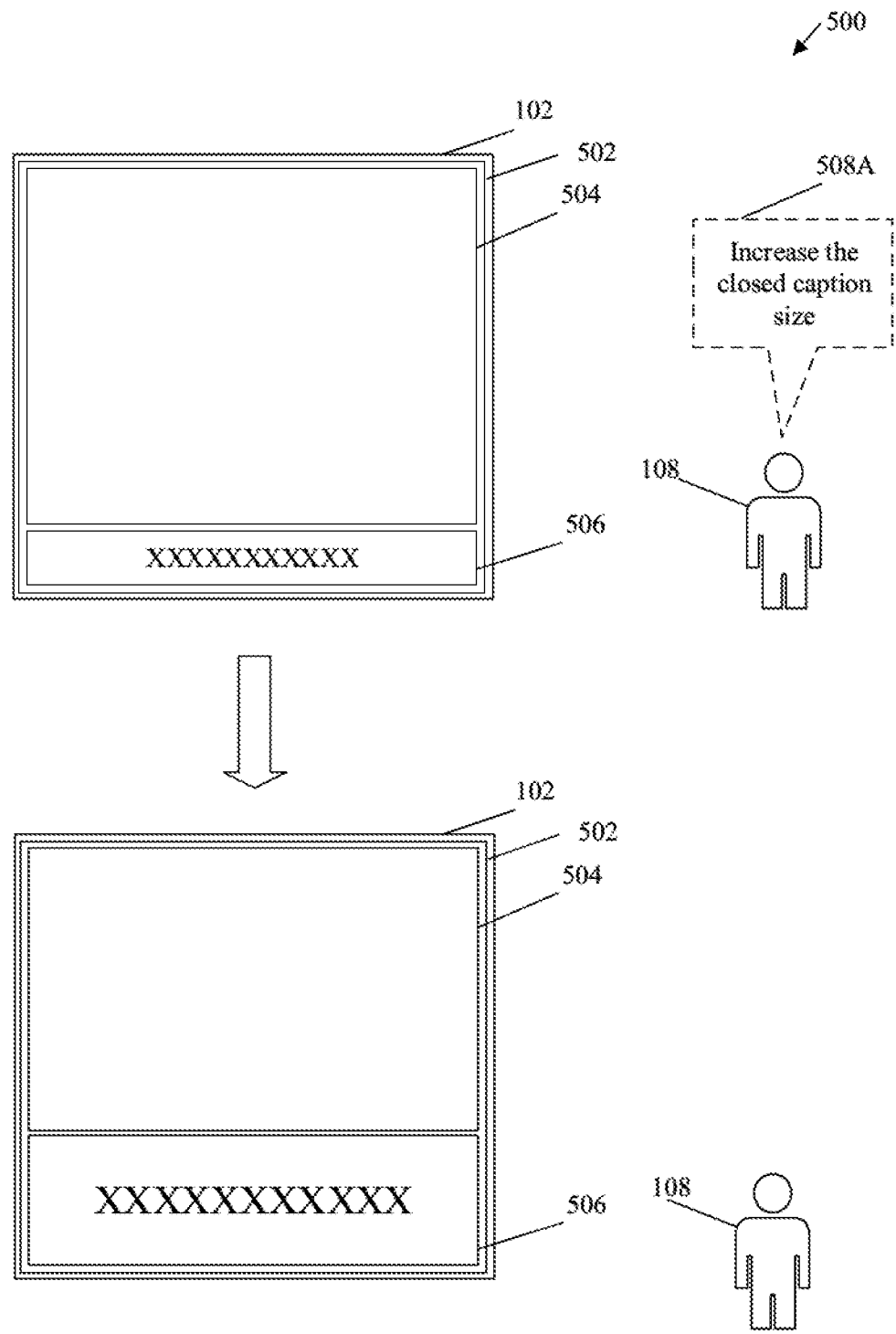
FIGS. 5A, 5B, and 5C, collectively, illustrate a second exemplary scenario for control of display of closed captions by the AV reproduction apparatus of FIG. 2 based on user input, in accordance with an embodiment of the disclosure.
Figure 5B:
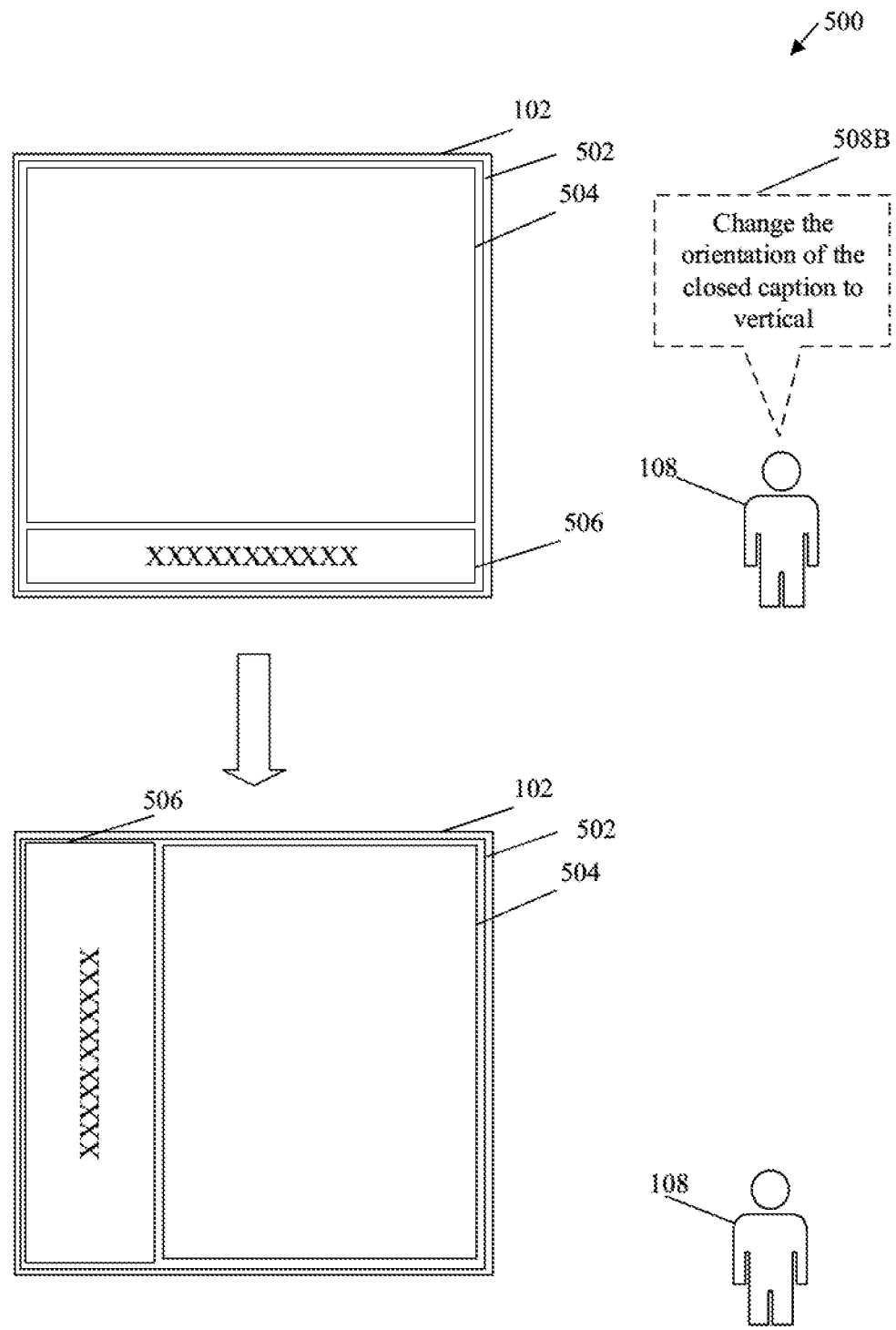
Figure 5C:
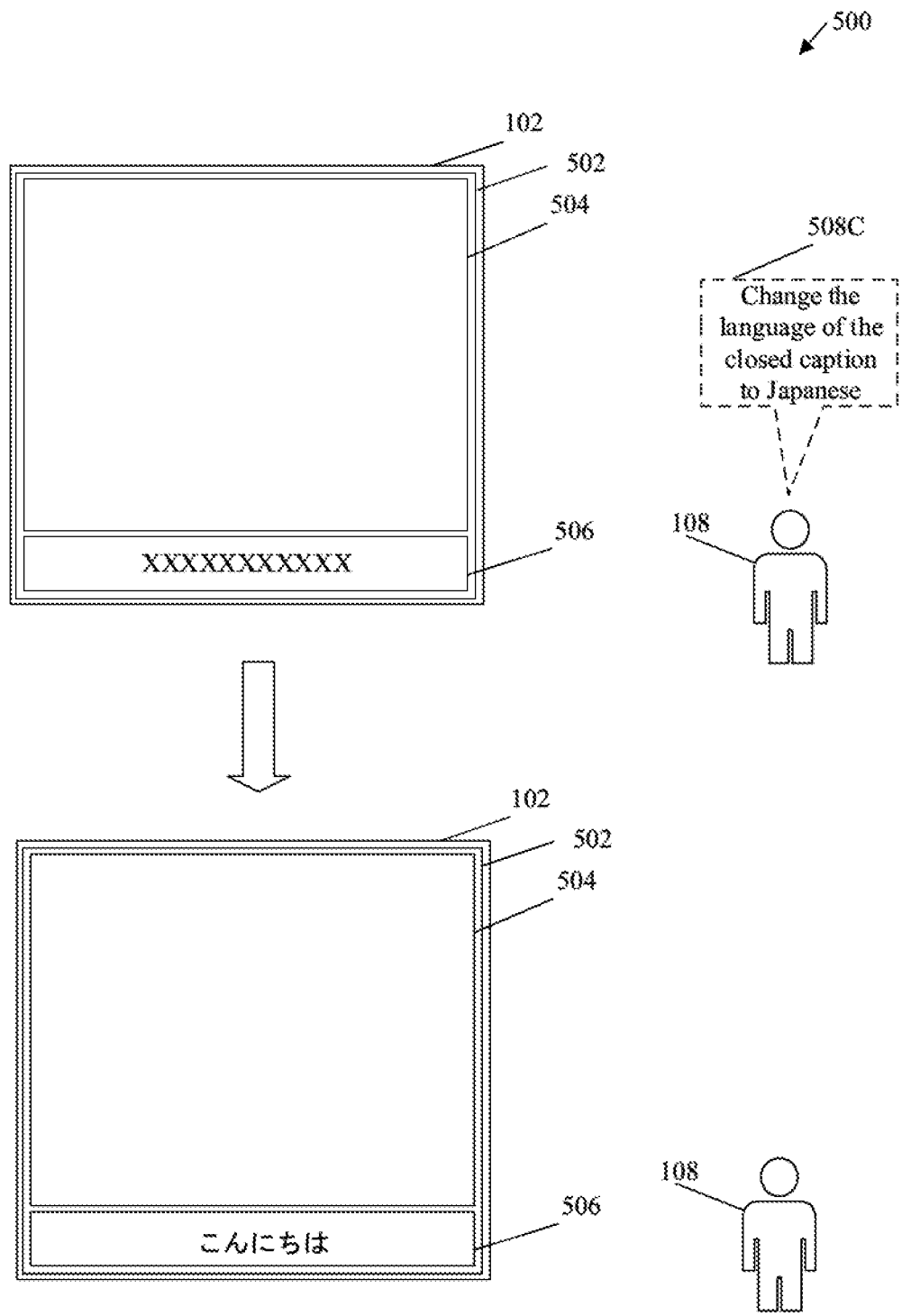

FIGS. 5A, 5B, and 5C, collectively, illustrate a second exemplary scenario for control of display of closed captions by the AV reproduction apparatus of FIG. 2 based on user input, in accordance with an embodiment of the disclosure. FIG. 5A is explained in conjunction with elements from FIGS. 1, 2, 3, and 4. With reference to FIG. 5A, there is shown a second exemplary scenario 500.

In the second exemplary scenario 500, there is shown the AV reproduction apparatus 102 which may include a display area 502 (similar to the display area 302 of FIG. 3). The display area 502 may include a first display portion 504 (similar to the first display portion 304 of FIG. 3) and a second display portion 506. The processor 204 may be configured to display the sequence of image frames 312 of the multi-media content on the first display portion 504 and the portions of CC information corresponding to the sequence of image frames on the second display portion 506.

In accordance with an embodiment, the processor 204 may be configured to receive the user input, via the plurality of I/O devices 212 or the plurality of sensors 214, from the user 108. The user input may be received to change the display characteristics of the multi-media content and the CC information displayed on the first display portion 504 and the second display portion 506, respectively. In some embodiments, the user input may be a touch input, voice-based input, or a gesture-based input. For example, the user input may be a first voice command 508A to increase a font size of the CC information displayed on the second display portion 506. The first voice command 508A may be "Increase the closed caption size" as shown in FIG. 5A. The CC display controller 206 may be configured to increase the size of the second display portion 506 and the font size of the CC information based on the received user input as shown in FIG. 5A. Simultaneously, the CC display controller 206 may be configured to reduce the size of the first display portion 504 based on the increased size of the second display portion 506. In accordance with an embodiment, the processor 204 may be further configured to control the display size or the resolution of the displayed sequence of image frames 312 based on the change in the size of the first display portion 504. In accordance with an embodiment, the CC display controller 206 may be configured to control the size or the display position of the first display portion 504 and the second display portion 506 based on different factors associated with the display area 502. Examples of different factors may include, but are not limited to, a shape, a size, or an aspect ratio of the display area 502.

With respect to FIG. 5B, the processor 204 may be configured to receive a second voice command 508B from the user 108 to change the orientation of the CC information displayed on the second display portion 506. The second voice command 508B may be "Change the orientation of the closed caption to vertical" as shown in FIG. 5B. The user 108 may provide the second voice command 508B for better viewing of the CC information based on a position of the user 108 with respect to the AV reproduction apparatus 102.

In accordance with an embodiment, the CC display controller 206 may be further configured to change a horizontal orientation of the second display portion 506 to a vertical orientation based on the received second voice command 508B. Simultaneously, the CC display controller 206 may be configured to adjust a shape and a size of the first display portion 504 based on the changed orientation of the CC information as shown in FIG. 5B. In accordance with an embodiment, the processor 204 may be further configured to control the display size or the resolution of the displayed sequence of image frames 312 based on the change in the shape or the size of the first display portion 504. In some embodiments, the processor 204 may be configured to receive the second voice command 508B to change the display position of the displayed CC information. For example, the second voice command 508B may be to change the display position from a bottom position to a top position of the display area 502.

With respect to FIG. 5C, the processor 204 may be configured to receive a third voice command 508C to change a language of the CC information displayed on the second display portion 506. For example, the third voice command 508C may be "Change the language of the closed caption to Japanese" as shown in FIG. 5C. In accordance with an embodiment, the CC display controller 206 may be configured to change a current language of the CC information (for example English) to a Japanese language based on the third voice command 508C. In some embodiments, the third voice command 508C may be configured to change the language based on a current location of the AV reproduction apparatus 102. In such case, the processor 204 may be configured to identify a current geo-location (for example using inbuilt GPS component) of the AV reproduction apparatus 102. The processor 204 may be further configured to identify the language in context with the identified geo-location. The processor 204 may be configured to retrieve a sample character set of the identified language from the memory 210 and further convert the current language of the displayed CC information to the identified language based on the retrieved character set. In accordance with an embodiment, the third voice command 508C may include the user input with respect to multiple languages. For example, in a situation, where the user 108 understands a particular language and another user present near to the user 108 understands a different language, the processor 204 may be configured to display the same CC information at different positions in different languages included in the third voice command 508C.

It may be noted that the change in the font size, orientation, and language of the CC information shown in FIGS. 5A, 5B, and 5C are merely examples of the display characteristics of the CC information. The present disclosure may be also applicable to other types of the display characteristics for example, but not limited to, a display position, a font, a display direction, contrast value, a foreground color, or a background color of the CC information. Thus, diverse types of the display characteristics provide the dynamic control of the CC information which may be useful for the user 108 (such as a visually-impaired user or a hearing-impaired user) without obscuring the displayed multi-media content. This further provides a better holistic viewing experience of the multi-media content and the associated CC information to the user 108.

Figure 6:
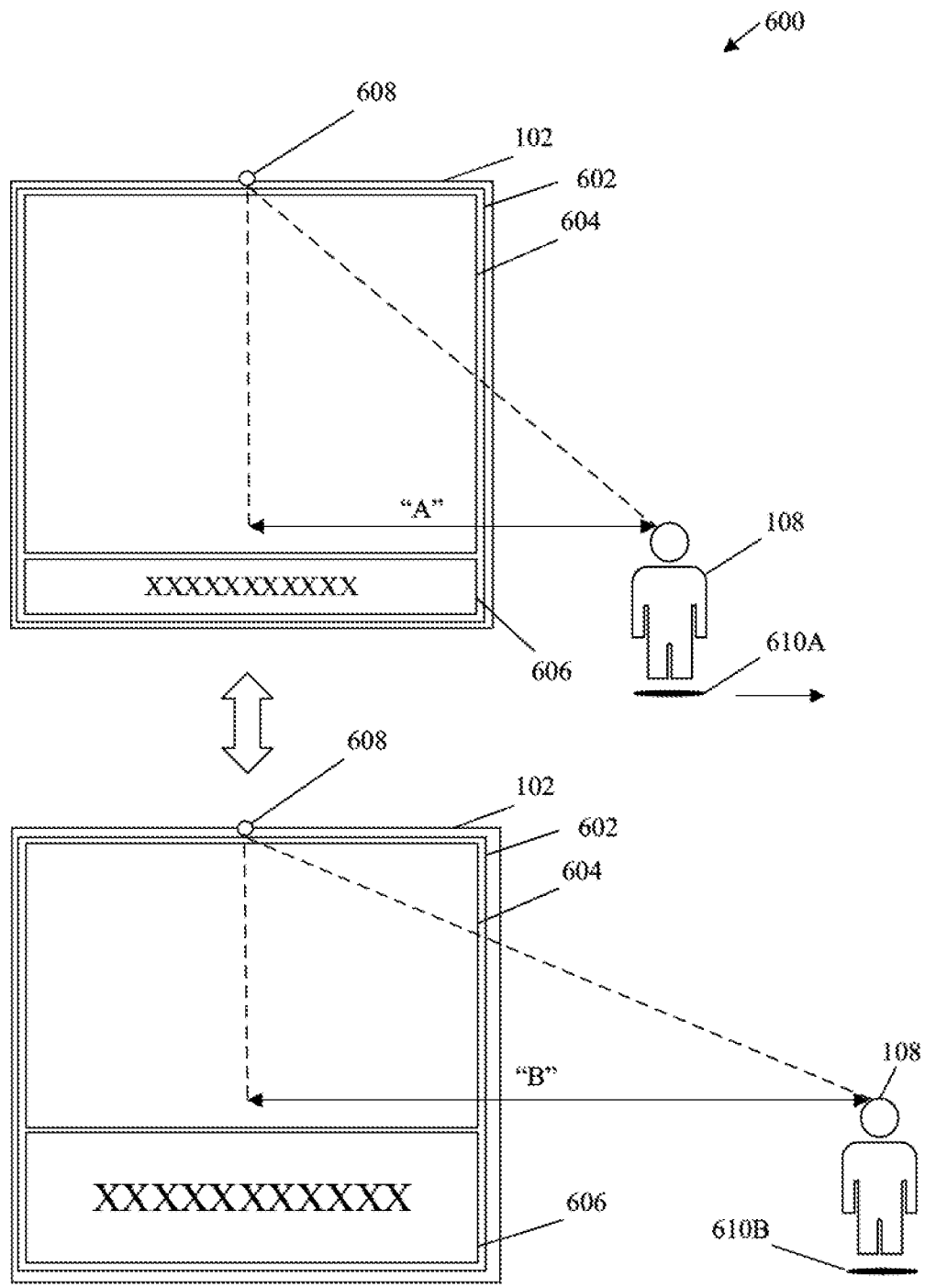
FIG. 6 illustrates a third exemplary scenario for control of display of closed captions by the AV reproduction apparatus of FIG. 2 based on position of viewer of the AV reproduction apparatus, in accordance with an embodiment of the disclosure.

FIG. 6 illustrates a third exemplary scenario for control of display of closed captions by the AV reproduction apparatus of FIG. 2 based on position of viewer of the AV reproduction apparatus, in accordance with an embodiment of the disclosure. FIG. 6 is explained in conjunction with elements from FIGS. 1, 2, 3, 4, 5A, 5B, and 5C. With reference to FIG. 6, there are shown a third exemplary scenario 600.

In the third exemplary scenario 600 there is shown the AV reproduction apparatus 102. The AV reproduction apparatus 102 may include a display area 602 (similar to the display area 302 of FIG. 3). The display area 602 may further include a first display portion 604 and a second display portion 606. The AV reproduction apparatus 102 may further include a sensor 608 (such as the image capturing device 214B of FIG. 2). The processor 204 may be configured to display the sequence of image frames 312 of the multi-media content on the first display portion 604 and the CC information corresponding to the sequence of image frames 312 on the second display portion 606.

In accordance with an embodiment, the sensor 608 may be configured to capture an image of the user 108 who may be present in front of the AV reproduction apparatus 102. The sensor 608 may be configured to capture the image based on a field-of-view (FOV) of the sensor 608. In accordance with an embodiment, the processor 204 may be further configured to detect a first distance A between a first position 610A of the user 108 and the AV reproduction apparatus 102 based on the captured image of the user 108. In case, the user 108 moves away or towards the AV reproduction apparatus 102, the processor 204 may be configured to detect the movement of the user 108 based on multiple images captured at a particular interval. For example, if the user 108 moves from the first position 610A to a second position 610B as shown in FIG. 6, the processor 204 may be configured to detect a second distance "B" between the second position 610B of the user 108 and the AV reproduction apparatus 102.

In accordance with an embodiment, the processor 204 may be further configured to compare the first distance A and the second distance "B" to detect that the user 108 has moved to the second position 610B from the first position 610A, where the second position 610B may be farther from the AV reproduction apparatus 102 than the first position 610A. In such case, based on the detection that the user 108 has moved away from the AV reproduction apparatus 102 from an initial position (i.e. first position 610A), the CC display controller 206 may be configured to increase the size of the CC information displayed on the second display portion 606 so the user 108 can easily view the CC information even from a farther distance (i.e. the second distance "B" shown in FIG. 6). In some embodiments, the CC display controller 206 may be configured to increase the size of the CC information when a difference between the first distance A and the second distance "B" is greater than a predefined threshold distance.

In accordance with an embodiment, the CC display controller 206 may be configured to increase the size of the CC information displayed on the second display portion 606 based on the position and the distance of the user 108 from the AV reproduction apparatus 102. The CC display controller 206 may be further configured to increase the size of the second display portion 606 based on the increased size of the CC information. The CC display controller 206 may be further configured to reduce the size of the first display portion 604 and the sequence of image frames 312 based on the increased size of the second display portion 606.

In accordance with an embodiment, the CC display controller 206 may be configured to reduce the size of the CC information based on the determination that the user 108 has moved closer to the AV reproduction apparatus 102 from an initial position. For example, in case the processor 204 detects that the user 108 has moved from the second position 610B to the first position 610A, the CC display controller 206 may be configured to reduce the size of the CC information displayed on the second display portion 606. In accordance to with an embodiment, the CC display controller 206 may be further configured to determine the display characteristics of the CC information based on the position of the user 108 with respect to the AV reproduction apparatus 102. The display characteristics may be a display position, a font style, a language, an orientation, a display direction, a contrast value, a foreground color, or a background color of the CC information.

In accordance with an embodiment, the processor 204 may be configured to detect multiple users from the captured image. The processor 204 may be further configured to determine the position or the distance of each user from the AV reproduction apparatus 102. The CC display controller 206 may be further configured to adjust the display characteristics of the CC information based on the determined position and/or the distance of each user captured in the image. The CC display controller 206 may adjust the display characteristics (for example size) considering that each user should be able to view the CC information clearly. In some embodiments, the CC display controller 206 may be configured to display the CC information at different positions on the display area 602 with different sizes for each user based on the determined position and/or distance of corresponding users. For example, for one user (such as user 108), the CC display controller 206 may display the CC information using a first font size on the second display portion 606 and for another user, the CC display controller 206 may display the same CC information using a second font size on another display portion (such as the third display portion 306B of FIG. 3). The second font size of the CC information may be greater than the first font size of the CC information considering that the other user may be farther from the AV reproduction apparatus 102 as compared to the user 108.

In accordance with an embodiment, the CC display controller 206 may be further configured to disable the display of the CC information based on the detected first distance A of the user 108 from the AV reproduction apparatus 102. For example, if the detected first distance A of the user 108 is greater than a first threshold distance or smaller than a second threshold distance, the CC display controller 206 may be configured to disable the display of the CC information considering that either the user 108 is too far from the AV reproduction apparatus 102 or too close to the AV reproduction apparatus 102.

In accordance with an embodiment, the CC display controller 206 may be further configured to determine the display characteristics of display of the CC information corresponding to the sequence of image frames 312 based on date-time information recorded by the AV reproduction apparatus 102. For example, the processor 204 may receive the user input from the user 108 to set different time periods to change the display characteristics of the CC information. The processor 204 may be configured to determine a current date-time from an inbuilt real-time clock (not shown) and accordingly change the display characteristics of the CC information based on the comparison between the determined current date-time and the set time periods.

Figure 7:
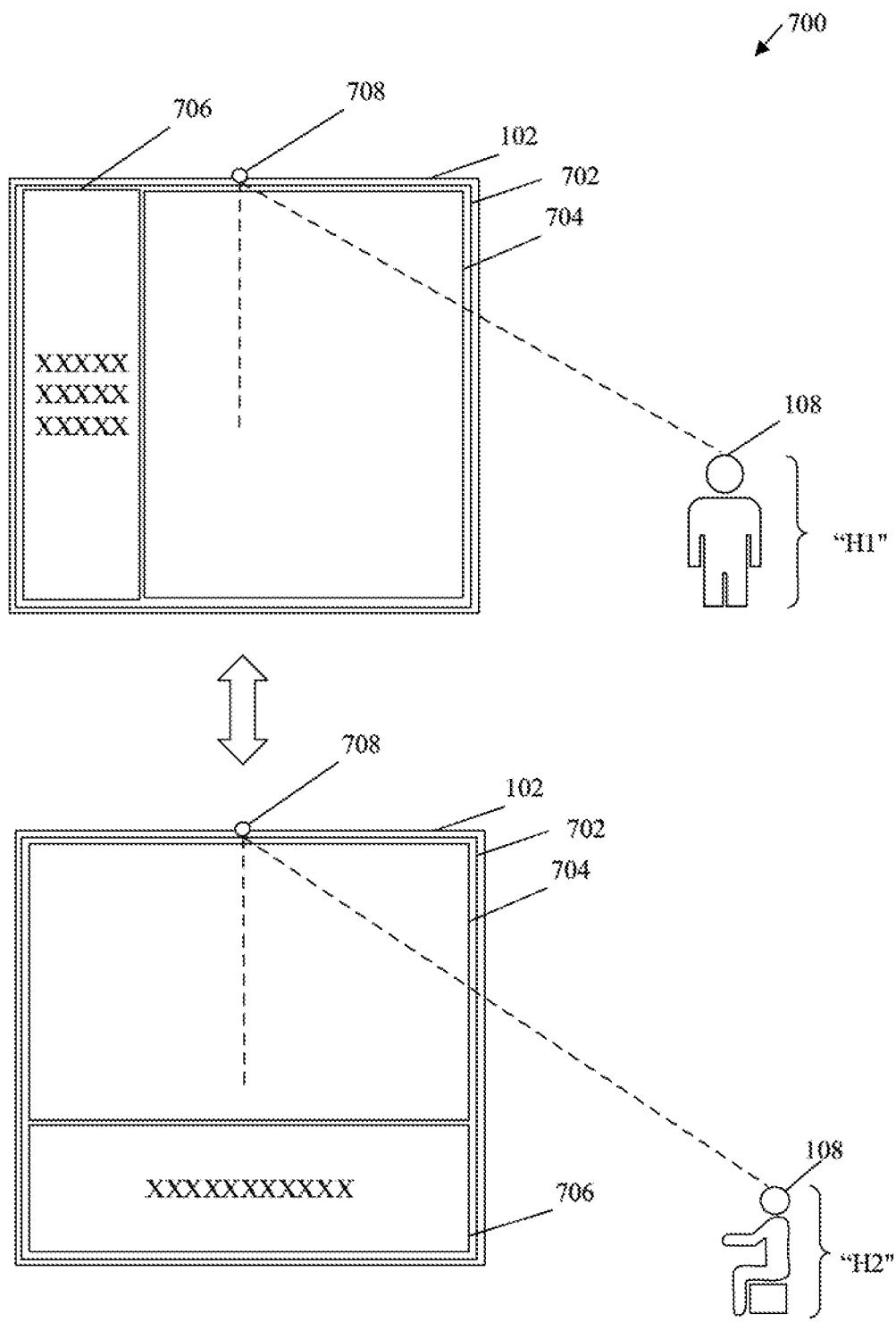
FIG. 7 illustrates a fourth exemplary scenario for control of display of closed captions by the AV reproduction apparatus of FIG. 2 based on posture of viewer of the AV reproduction apparatus, in accordance with an embodiment of the disclosure.

FIG. 7 illustrates a fourth exemplary scenario for control of display of closed captions by the AV reproduction apparatus of FIG. 2 based on posture of viewer of the AV reproduction apparatus of FIG. 2, in accordance with an embodiment of the disclosure. FIG. 7 is explained in conjunction with elements from FIGS. 1, 2, 3, 4, 5A, 5B, 5C, and 6. With reference to FIG. 7, there are shown a fourth exemplary scenario 700.

In the fourth exemplary scenario 700, there is shown the AV reproduction apparatus 102. The AV reproduction apparatus 102 may include a display area 702 (similar to the display area 302 of FIG. 3). The display area 702 may further include a first display portion 704 configured to display the sequence of image frames 312 of the multi-media content, and include a second display portion 706 configured to display the CC information corresponding to the multi-media content for the user 108. The AV reproduction apparatus 102 may further include a sensor 708 (such as the image capturing device 214B of FIG. 2 or the sensor 608 of FIG. 6).

In accordance with an embodiment, the sensor 708 may be configured to detect an image of the user 108 who may be present in front of the AV reproduction apparatus 102. The processor 204 may be configured to determine a first height "H1" of the user 108 (i.e. who is standing as per FIG. 7) based on the captured image. In accordance with an embodiment, the processor 204 may be further configured to detect a posture (for example a standing posture) of the user 108 with respect to the AV reproduction apparatus 102 based on the detected first height "H1". In some embodiments, the processor 204 may be further configured to detect the posture of the user 108 from the captured image using one or more image processing techniques known in the art.

In accordance with an embodiment, the processor 204 may be further configured to detect a change in the posture of the user 108. For example, if the user 108 is sitting or lying on a bed, the processor 204 may detect the change in the height of the user 108 from first height "H1 to a second height "H2". The processor 204 may be further configured to detect the change in the posture (for example from a standing posture to a sitting posture as shown in FIG. 7) based on the detected change in the height of the user 108. The CC display controller 206 may be further configured to change the orientation (for example, from a portrait orientation to a landscape orientation) of the CC information displayed on the second display portion 706 based on the change in the posture of the user 108 (as shown in FIG. 7). The CC display controller 206 may be further configured to change the orientation of the second display portion 706 based on the change in the orientation of the CC information. In accordance with an embodiment, the CC display controller 206 may be configured to change the display position of the CC information in the second display portion 706 based on the change in the posture of the user 108. The changed position may be different from an initial display position of the CC information displayed in the second display portion 706. The change in the orientation or the display position of the CC information may provide a better viewability of the CC information to the user 108 as per the changed posture of the user 108. In accordance with an embodiment, the AV reproduction apparatus 102 may be further configured to control the display characteristics of the CC information based on the detected posture of the user 108.

Figure 8A:
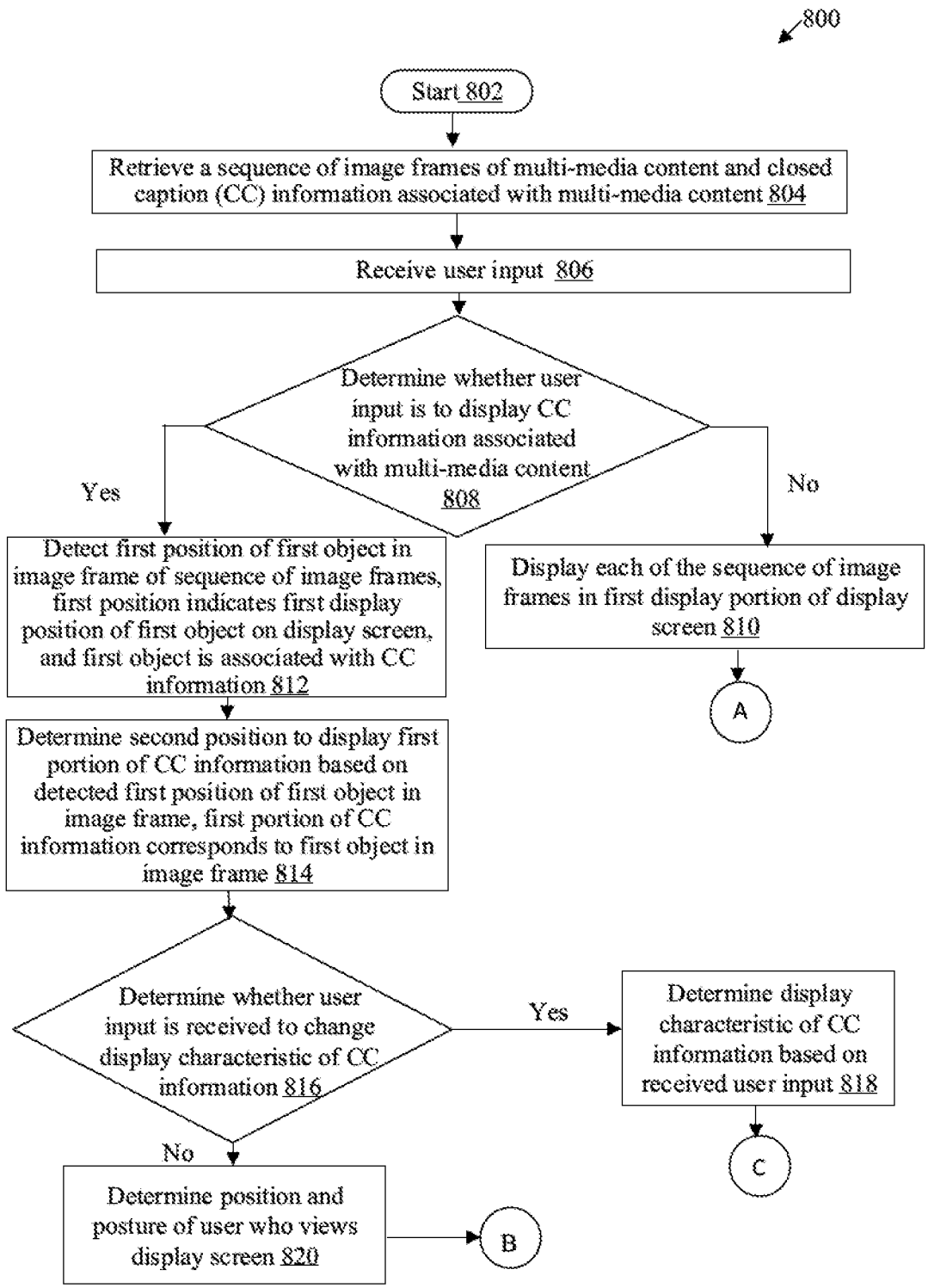
FIGS. 8A and 8B, collectively, depict a flow chart that illustrates exemplary operations for control of display of closed captions based on multi-media content, in accordance with an embodiment of the disclosure.
Figure 8B:
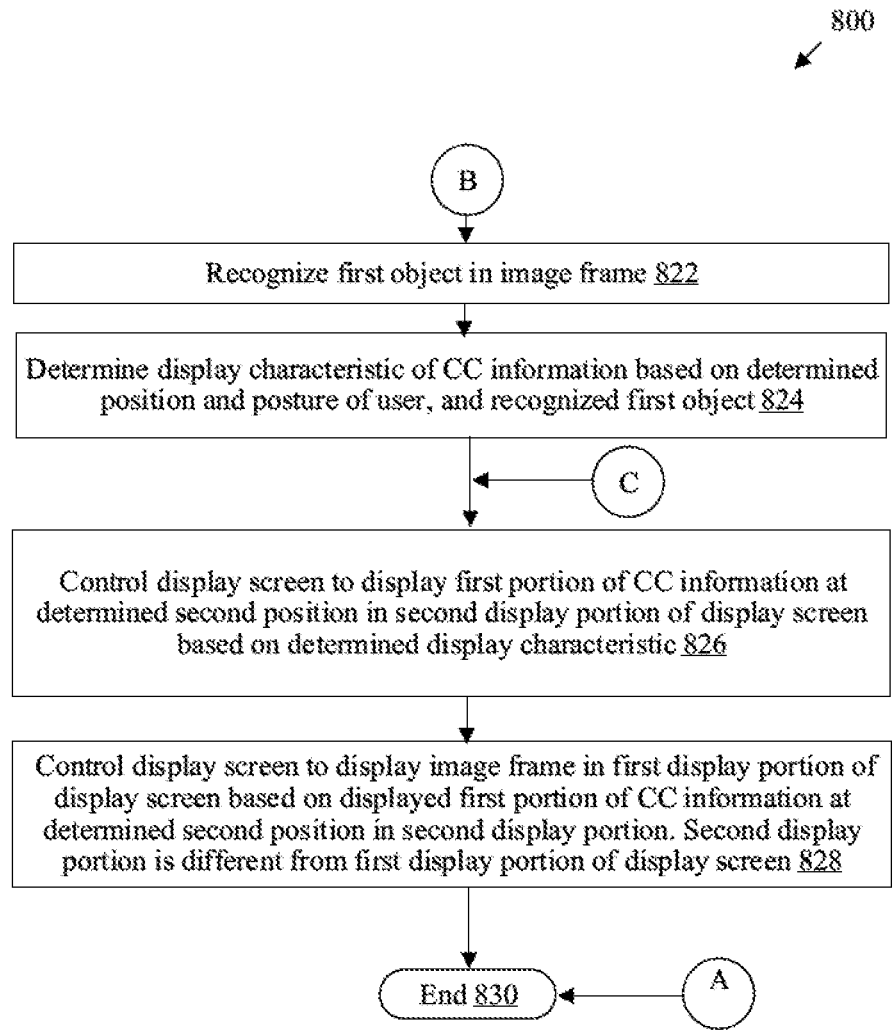

FIGS. 8A and 8B, collectively, depict a flow chart that illustrates exemplary operations for control of display of closed captions based on multi-media content, in accordance with an embodiment of the disclosure. With reference to FIGS. 8A and 8B, there is shown a flowchart 800. The flowchart 800 is described in conjunction with FIGS. 1, 2, 3, 4, 5A, 5B, 5C, 6, and 7. The operations from 802 to 830 may be implemented in the AV reproduction apparatus 102. The operations of the flowchart 800 may start at 802 and proceed to 804.

At 804, a sequence of image frames of multi-media content and closed caption (CC) information associated with the multi-media content may be retrieved. In accordance with an embodiment, the processor 204 may be configured to retrieve the multi-media content and the CC information associated with the multi-media content from the multi-media content source 106. In some embodiments, the processor 204 may be further configured to retrieve the multi-media content and the CC information associated with the multi-media content from the memory 210.

At 806, a user input may be received. In accordance with an embodiment, the processor 204 may be configured to receive the user input through the plurality of I/O devices 212 or the plurality of sensors 214 of the AV reproduction apparatus 102. Examples of the user input may include, are not limited to, a touch input, the gesture input, or the voice input.

At 808, it may be determined whether the user input is to display the CC information associated with the multi-media content. In accordance with an embodiment, the processor 204 may be configured to determine whether the user input is to display the CC information associated with the multi-media content on a display screen 212A. In cases, where the user input is to display the CC information associated with the multi-media content, then the control passes to 812. Otherwise, the control passes to 810.

At 810, each of the sequence of image frames may be displayed in a first display portion of the display screen 212A. The CC display controller 206 may be further configured to display the sequence of image frames in the detected first display portion of the display screen 212A in case the user input is not to display the CC information along with the rendering of the multi-media content. The control passes to end 830.

At 812, a first position of a first object in an image frame of the sequence of image frames may be detected. The first position may indicate a first display position of the first object on the display screen 212A. The first object may be associated with the CC information. In accordance with an embodiment, the CC display controller 206 may be configured to detect the first position of the first object on the display screen 212A. The determination of the first position may be described in detail, for example, in FIG. 3.

At 814, a second position to display a first portion of the CC information may be determined based on the detected first position of the first object in the image frame. The first portion of the CC information may correspond to the first object in the image frame. In accordance with an embodiment, the CC display controller 206 may be configured to determine the second position to display the first portion of the CC information. The determination of the second position may be described in detail, for example, in FIG. 3.

At 816, it may be determined whether a user input is received to change the display characteristics of the CC information. In accordance with an embodiment, the processor 204 may be configured to determine whether the user input is received to change the display characteristics of the CC information. The display characteristics may be at least one of a font, a size, a display direction, a foreground color, a background color, an orientation, a contrast value, or a language of the displayed CC information. In cases, where the user input is not received to change the display characteristics of the CC information the control passes to 816. Otherwise, the control passes to 818.

At 818, the display characteristics of the CC information may be determined based on the received user input. In accordance with an embodiment, the CC display controller 206 may be configured to determine the display characteristics of the CC information based on the received user input. The display characteristics based on the received user input may be described in detail, for example, in FIGS. 5A, 5B, and 5C. The control passed to 826.

At 820, a position and a posture of the user 108 who views the display screen 212 may be determined. The plurality of sensors 214 may be configured to detect the position and the posture of the user 108. The determination of the position and the posture of the user 108 may be described in detail, for example, in FIGS. 6 and 7.

At 822, the first object in the image frame may be recognized. In accordance with an embodiment, the processor 204 may be configured to recognize the first object in the image frame of the sequence of image frames as described in detail, for example, in FIG. 3.

At 824, display characteristics of the CC information may be determined based on the determined position and the posture of the user 108, and the recognized first object. In accordance with an embodiment, the CC display controller 206 may be configured to determine the display characteristics of the CC information based on the detected position and posture of the user 108, and the recognized first object as described in detail, for example, in FIGS. 3, 5A, 5B, 5C, 6, and 7.

At 826, the display screen may be controlled to display the first portion of the CC information at the determined second position in the second display portion of the display screen based on the determined display characteristics. In accordance with an embodiment, the CC display controller 206 may be configured to control the display screen 212A to display the first portion of the CC information at the determined second position in the second display portion.

At 828, the display screen may be controlled to display the image frame in the first display portion of the display screen based on the displayed first portion of the CC information at the determined second position in the second display portion. The second display portion may be different than the first display portion of the display screen 212A. In accordance with an embodiment, the CC display controller 206 may be configured to control the display screen 212A to display the image frame of the sequence of image frames in the first display portion based on the displayed first portion of the CC information at the determined second position in the second display portion. The control passes to end 830.

Various embodiments of the disclosure provide an audio-video (AV) reproduction apparatus (e.g. AV reproduction apparatus 102). The AV reproduction apparatus 102 may include a display screen (e.g. the display screen 212A). The AV reproduction apparatus 102 may further include a memory (e.g. memory 210) configured to store a sequence of image frames of multi-media content and closed caption (CC) information associated with the multi-media content. The AV reproduction apparatus 102 may further include circuitry (e.g. the circuitry 202) configured to detect a first position of a first object in an image frame, of the sequence of image frames, to be displayed on the display screen 212A. The first position may indicate a first display position of the first object on the display screen 212A. The circuitry 202 may be further configured to control, based on a user-input, the display screen 212A to display the image frame in a first display portion of the display screen 212A and display a first portion of the CC information at a second position in a second display portion of the display screen 212A. The first portion of the CC information may correspond to the first object in the image frame. The first portion of the CC information may be displayed at the second position in the second display portion, based on the detected first position of the first object in the image frame. The second display portion may be different from the first display portion of the display screen 212A.

In accordance with an embodiment, the circuitry 202 may be further configured to detect a third position of a second object in the image frame. The third position may indicate a second display position of the second object on the display screen 212A. The circuitry 202 may be further configured to control, based on the user-input, the display screen 212A to display a second portion of the CC information at a fourth position in a third display portion of the display screen 212A. The second portion of the CC information may correspond to the second object in the image frame. The second portion of the CC information may be displayed at the fourth position in the third display portion based on the detected third position of the second object in the image frame. The third display portion may be different from the first display portion and the second display portion.

In accordance with an embodiment, the first object may be an image of a first person and the second object may be an image of a second person different from the first person. The displayed first portion of the CC information may comprise a textual representation of audio content associated with the first object in the image frame. In accordance with an embodiment, the first object may be an image of a first person, and the audio content associated with the first object may be at least one of a dialogue or a thought of the first person.

In accordance with an embodiment, a position of the second display portion on the display screen 212A may be based on at least one of a shape, a size, or an aspect ratio of the display screen. The AV reproduction apparatus 102 may be communicatively coupled to an external display screen (e.g. external display screen 402). The circuitry 202 may be further configured to control the external display screen 402 to display the first portion of the CC information on the external display screen 402.

In accordance with an embodiment, the circuitry 202 may be further configured to change, a first size of the displayed first portion of the CC information and a second size of the second display portion, based on the user-input. The user-input may be at least one of a gesture input, a voice input, or a touch input.

In accordance with an embodiment, the circuitry 202 may be further configured to change a third size of the displayed image frame and a fourth size of the first display portion based on the change in the first size of the displayed first portion of the CC information.

In accordance with an embodiment, the circuitry 202 may be further configured to change, a first size of the displayed first portion of the CC information, based on the first object.

In accordance with an embodiment, the circuitry 202 may be further configured to change at least one of a font, a size, a display direction, a foreground color, a background color, an orientation, a contrast value, or a language of the first portion of the CC information based on the user-input.

In accordance with an embodiment, the circuitry 202 may be further configured to recognize the first object in the image frame, and change at least one of a font, a size, a display direction, a foreground color, a background color, an orientation, a contrast value, or a language of the first portion of the CC information based on the recognized first object.

In accordance with an embodiment, the circuitry 202 may be further configured to determine a first distance between the AV reproduction apparatus 102 and a first user associated with the user-input. The circuitry 202 may be further configured to change, a first size of the first portion of the CC information, based on the determined first distance.

In accordance with an embodiment, the AV reproduction apparatus 102 may further include an image capturing device (e.g. image capturing device 214B). The circuitry 202 may be further configured to control the image capturing device 214B to detect a second user. The second distance between the AV reproduction apparatus 102 and the second user may be greater than the determined first distance. The circuitry 202 may be further configured to control the display screen to display the first portion of the CC information in a third display portion. The third display portion may be different from the first display portion and the second display portion. The second size of the first portion of the CC information in the third display portion may be greater than the first size of the first portion of the CC information in the second display portion.

In accordance with an embodiment, the circuitry 202 may be further configured to disable display of the first portion of the CC information based on the determined first distance.

In accordance with an embodiment, the circuitry 202 may be further configured to control the image capturing device 214B to detect a posture of a user associated with the user-input and further control the display screen 212A to display the first portion of the CC information at a third position in the second display portion based on the detected posture of the user. The third position may be different from the second position in the second display portion. In accordance with an embodiment, the circuitry 202 may be further configured to change an orientation of the displayed first portion of the CC information based on the detected posture of the user.

Various embodiments of the disclosure may provide a non-transitory, computer readable medium and/or storage medium, and/or a non-transitory machine readable medium and/or storage medium stored thereon, a machine code and/or a computer program with at least one code section executable by a machine and/or a computer for display of closed captions based on multi-media content. The at least one code section may cause the machine and/or computer to perform the steps that comprise storage of a sequence of image frames of multi-media content and closed caption (CC) information associated with the multi-media content in a memory. Further, a first position of a first object in an image frame, of the sequence of image frames, may be detected. The image frame is to be displayed on a display screen. The first position may indicate a first display position of the first object on the display screen. Further, based on a user-input, the display screen may be controlled to display the image frame in a first display portion of the display screen and display a first portion of the CC information at a second position in a second display portion of the display screen. The first portion of the CC information may correspond to the first object in the image frame. The first portion of the CC information may be displayed at the second position in the second display portion, based on the detected first position of the first object in the image frame. The second display portion is different than the first display portion of the display screen.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An audio-video (AV) reproduction apparatus, comprising:
   a display screen;
   a memory configured to store a sequence of image frames of multi-media content and closed caption (CC) information associated with the multi-media content; and
   circuitry configured to:
   detect a first position of a first object in an image frame, of the sequence of image frames, to be displayed on the display screen,
      wherein the detected first position indicates a first display position of the first object on the display screen;
   control, based on a user-input, the display screen to display the image frame in a first display portion of the display screen and display a first portion of the CC information at a second position in a second display portion of the display screen, wherein
      the first portion of the CC information corresponds to the first object in the image frame,
      the first portion of the CC information is displayed at the second position in the second display portion based on the detected first position of the first object in the image frame, and
      the second display portion is different from the first display portion;
   recognize the first object in the image frame; and
   change at least one of a font, a first size, a display direction, a foreground color, a background color, an orientation, a contrast value, or a language of the displayed first portion of the CC information based on the recognized first object.

2. The AV reproduction apparatus according to claim 1, wherein the circuitry is further configured to:
   detect a third position of a second object in the image frame, wherein the third position indicates a second display position of the second object on the display screen; and
   control, based on the user-input, the display screen to display a second portion of the CC information at a fourth position in a third display portion of the display screen, wherein
   the second portion of the CC information corresponds to the second object in the image frame,
   the second portion of the CC information is displayed at the fourth position in the third display portion based on the detected third position of the second object in the image frame, and
   the third display portion is different from the first display portion and the second display portion.

3. The AV reproduction apparatus according to claim 2, wherein the first object is an image of a first person and the second object is an image of a second person different from the first person.

4. The AV reproduction apparatus according to claim 1, wherein the displayed first portion of the CC information comprises a textual representation of audio content associated with the first object in the image frame.

5. The AV reproduction apparatus according to claim 4, wherein
   the first object is an image of a first person, and
   the audio content associated with the first object is at least one of a dialogue or a thought of the first person.

6. The AV reproduction apparatus according to claim 1, wherein the second position of the second display portion on the display screen is based on at least one of a shape, a size, or an aspect ratio of the display screen.

7. The AV reproduction apparatus according to claim 1, wherein
the AV reproduction apparatus is communicatively coupled to an external display screen, and
the circuitry is further configured to control the external display screen to display the first portion of the CC information on the external display screen.

8. The AV reproduction apparatus according to claim 1, wherein
the user-input is at least one of a gesture input, a voice input, or a touch input.

9. The AV reproduction apparatus according to claim 8, wherein the circuitry is further configured to change a third size of the displayed image frame and a fourth size of the first display portion based on the change in the first size of the displayed first portion of the CC information.

10. The AV reproduction apparatus according to claim 1, wherein the circuitry is further configured to change, the first size of the displayed first portion of the CC information, based on the first object.

11. The AV reproduction apparatus according to claim 1, wherein the circuitry is further configured to:
determine a first distance between the AV reproduction apparatus and a first user associated with the user-input; and
change, the first size of the first portion of the CC information, based on the determined first distance.

12. The AV reproduction apparatus according to claim 11, further comprising an image capturing device, wherein the circuitry is further configured to:
control the image capturing device to detect a second user, wherein a second distance between the AV reproduction apparatus and the second user is greater than the determined first distance; and
control the display screen to display the first portion of the CC information in a third display portion, wherein
the third display portion is different from the first display portion and the second display portion, and
a second size of the first portion of the CC information in the third display portion is greater than the first size of the first portion of the CC information in the second display portion.

13. The AV reproduction apparatus according to claim 12, wherein the circuitry is further configured to disable display of the first portion of the CC information based on the determined first distance.

14. The AV reproduction apparatus according to claim 1, further comprising an image capturing device, wherein the circuitry is further configured to:
control the image capturing device to detect a posture of a user associated with the user-input; and
control the display screen to display the first portion of the CC information at a third position in the second display portion based on the detected posture of the user, wherein the third position is different from the second position.

15. The AV reproduction apparatus according to claim 14, wherein the circuitry is further configured to change the orientation of the displayed first portion of the CC information based on the detected posture of the user.

16. A method, comprising:
in an audio-video reproduction apparatus which includes
a display screen, and
a memory to store a sequence of image frames of multi-media content and closed caption (CC) information associated with the multi-media content:
detecting a first position of an object in an image frame, of the sequence of image frames, to be displayed on the display screen,
wherein the detected first position indicates a first display position of the object on the display screen;
controlling, based on a user-input, the display screen to display the image frame in a first display portion of the display screen and display a portion of the CC information at a second position in a second display portion of the display screen, wherein
the portion of the CC information corresponds to the first object in the image frame,
the portion of the CC information is displayed at the second position in the second display portion based on the detected first position of the first object in the image frame, and
the second display portion is different from the first display portion;
recognizing the object in the image frame; and
changing at least one of a font, a size, a display direction, a foreground color, a background color, an orientation, a contrast value, or a language of the portion of the CC information based on the recognized object.

17. The method according to claim 16, wherein the displayed portion of the CC information comprises a textual representation of audio content associated with the object in the image frame.

* * * * *